(12) United States Patent
Prasher et al.

(10) Patent No.: US 12,555,819 B2
(45) Date of Patent: Feb. 17, 2026

(54) THERMAL ENERGY STORAGE WITH PHASE CHANGE MATERIALS HAVING AN ADJUSTABLE TRANSITION TEMPERATURE

(71) Applicant: The Regents of the University of California, Oakland, CA (US)

(72) Inventors: Ravi Prasher, Danville, CA (US); Sumanjeet Kaur, Pinole, CA (US); Gao Liu, Piedmont, CA (US); Christopher Dames, Berkeley, CA (US); Jonathan Lau, Fremont, CA (US); Drew Lilley, Berkeley, CA (US); Piyachai Khomein, San Bruno, CA (US); Joseph Papp, Martinez, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 580 days.

(21) Appl. No.: 17/898,550

(22) Filed: Aug. 30, 2022

(65) Prior Publication Data

US 2023/0187686 A1 Jun. 15, 2023

Related U.S. Application Data

(60) Provisional application No. 63/240,497, filed on Sep. 3, 2021.

(51) Int. Cl.
*H01M 10/056* (2010.01)
*H01M 4/02* (2006.01)
(Continued)

(52) U.S. Cl.
CPC ......... *H01M 10/056* (2013.01); *H01M 4/364* (2013.01); *H01M 4/485* (2013.01);
(Continued)

(58) Field of Classification Search
CPC ............ H01M 10/056; H01M 10/052; H01M 10/0565; H01M 10/0568; H01M 10/0569;
(Continued)

(56) References Cited

U.S. PATENT DOCUMENTS

| | | | | |
|---|---|---|---|---|
| 2004/0079793 | A1* | 4/2004 | Mayer ............... | B65D 81/3816 229/103.11 |
| 2013/0199753 | A1* | 8/2013 | Muren .................... | H02S 40/38 165/80.1 |

(Continued)

OTHER PUBLICATIONS

M. Song et al., "Review on building energy performance improvement using phase change materials" Energy Build., 158 (2018), pp. 776-793.

(Continued)

*Primary Examiner* — Matthew W Van Oudenaren

(57) ABSTRACT

This disclosure provides systems, methods, and apparatus related to thermal energy storage with phase change materials having an adjustable transition temperature. In one aspect, a method includes providing a device. The devices includes a phase change material, a salt dissolved in the phase change material, and an anode and a cathode disposed in the phase change material. The phase change material changes from a solid to a liquid at a first temperature when the salt is dissolved in the phase change material. A voltage is applied to the anode and the cathode to substantially remove the salt from the phase change material. The phase change material changes from the solid to the liquid at a second temperature when the salt is substantially removed from the phase change material, with the first temperature being a lower temperature than the second temperature.

33 Claims, 8 Drawing Sheets

(51) Int. Cl.

| | |
|---|---|
| H01M 4/36 | (2006.01) |
| H01M 4/485 | (2010.01) |
| H01M 4/583 | (2010.01) |
| H01M 4/60 | (2006.01) |
| H01M 10/052 | (2010.01) |
| H01M 50/417 | (2021.01) |
| H01M 50/426 | (2021.01) |
| H01M 50/46 | (2021.01) |

(52) U.S. Cl.
CPC ........... *H01M 4/583* (2013.01); *H01M 4/608* (2013.01); *H01M 10/052* (2013.01); *H01M 50/417* (2021.01); *H01M 50/426* (2021.01); *H01M 50/46* (2021.01); *H01M 2004/027* (2013.01); *H01M 2004/028* (2013.01)

(58) Field of Classification Search
CPC ...... H01M 4/364; H01M 4/485; H01M 4/583; H01M 4/608; H01M 4/62; H01M 4/625; H01M 50/417; H01M 50/426; H01M 50/46; H01M 2004/027; H01M 2004/028
See application file for complete search history.

(56) References Cited

U.S. PATENT DOCUMENTS

| | | | |
|---|---|---|---|
| 2020/0207646 A1* | 7/2020 | Kim | C02F 1/4604 |
| 2021/0104665 A1* | 4/2021 | Heo | H10N 70/231 |

OTHER PUBLICATIONS

Y. Peng et al., "Advanced textiles for personal thermal management and energy" Joule, 4 (2020), pp. 724-742.
A.K. Stark et al., "An R&D strategy to decouple energy from water" Joule, 1 (2017), pp. 416-420.
Z. Ling et al., "Review on thermal management systems using phase change materials for electronic components, Li-ion batteries and photovoltaic modules" Renew. Sustain, Energy Rev., 31 (2014), pp. 427-438
S. Singh et al., "Phase change materials for advanced cooling packaging" Environ. Chem. Lett., 16 (2018), pp. 845-859.
C.E. tas et al., "Thermally buffering polyethylene/halloysite/phase change material nanocomposite packaging films for cold storage of foods" J. Food Eng., 292 (2021), p. 110351.
N. Agrawal et al., "Role of phase change materials for safe transportation of pharmaceutical goods" International Pharmaceutical Industry, Winter 2019, vol. 11, Issue 4, pp. 44-46.
M. Fang et al., "Effects of different multiple PCMs on the performance of a latent thermal energy storage system" Appl. Therm. Eng., 27 (2007), pp. 994-1000.
B. Li et al., "Colossal barocaloric effects in plastic crystals" Nature, 567 (2019), pp. 506-510.
A.S. Mischenko et al., "Giant electrocaloric effect in thin-film PbZr(0.95)Ti(0.05)O3" Science, 311 (2006), pp. 1270-1271.
V.K. Pecharsky et al., "Giant agnetocaloric effect in Gd-5(SI2Ge2)" Phys. Rev. Lett., 78 (1997), pp. 4494-4497.
G.G.D. Han et al., "Optically-regulated thermal energy storage in diverse organic phase-change materials" Chem. Commun. (Camb.), 54 (2018), pp. 10722-10725.
G.G.D. Han et al., "Optically-controlled long-term storage and release of thermal energy in phase-change materials" Nat. Commun., 8 (2017), p. 1446.
A. Hnery et al., "Five thermal energy grand challenges for decarbonization" Nat. Energy, 5 (2020), pp. 635-637.
G. Liu et al., "Synthesis, structure, and ionic conductivity of self-assembled amphiphilic poly(methacrylate) comb polymers" Macromolecules, 39 (2006), pp. 4726-4734.
G. Liu et al., "Nanoscale lithium ion conducting polyethylene oxide with self-attached insulating layers" Solid State Ion., 175 (2004), pp. 721-724.
M. Wang et al., "A review on the features and progress of dual-ion batteries" Adv. Energy Mater., 8 (2018), p. 1703320.
S. Rothermel et al., "Dual-graphite cells based on the reversible intercalation of bis(trifluoromethanesulfonyl)imide anions from an ionic liquid electrolyte" Energy Environ. Sci., 7 (2014), pp. 3412-3423.
B. Dunn et al., "Electrical energy storage for the grid: a battery of choices" Science, 334 (2011), pp. 928-935.
K. Xu, "Nonaqueous liquid electrolytes for lithium-based rechargeable batteries" Chem. Rev., 104 (2004), pp. 4303-4417.
Y. Kou et al., "Thermal analysis and heat capacity study of polyethylene glycol (PEG) phase change materials for thermal energy storage applications" J. Chem. Thermodyn., 128 (2019), pp. 259-274.
S. Karaman et al., "Polyethylene glycol (PEG)/diatomite composite as a novel form-stable phase change material for thermal energy storage" Sol. Energy Mater, Sol. Cells, 95 (2011), pp. 1647-1653.
S.S. Zhang, "Lithium oxalyldifluoroborate as a salt for the improved electrolytes of Li-ion batteries" ECS Trans., 3 (2019), pp. 59-68.
G. Homann et al., "Poly(ethylene oxide)-based electrolyte for solid-state-lithium-batteries with high voltage positive electrodes: evaluating the role of electrolyte oxidation in rapid cell failure" Sci. Rep., 10 (2020), p. 4390.
M.S. Whittingham, "Lithium batteries and cathode materials" Chem, Rev., 104 (2004), pp. 4271-4301.
T. Placke et al., "Influence of graphite characteristics on the electrochemical intercalation of bis (trifluoromethanesulfonyl) imide anions into a graphite-based cathode" J. Electrochem. Soc., 160 (2013), pp. A1979-A1991.
J. Kim et al., "Redox-active polymers for energy storage nanoarchitectonics" Joule, 1 (2017), pp. 739-768.
T.H. Le et al., "Electrical and Electrochemical Properties of Conducting Polymers" Polymers, 9 (2017), p. 150.
J.R. Harding et al., "Instability of poly(ethylene oxide) upon oxidation in lithium-air batteries" J. Phys. Chem. C, 119 (2015), pp. 6947-6955.
K.R. Reddy et al., "Synthesis of MWCNTs-core/thiophene polymer-sheath composite nanocables by a cationic surfactant-assisted chemical oxidative polymerization and their structural properties" J. Polym, Sci. A Polym. Chem., 48 (2010), pp. 1477-1484.
J. Lau et al., "Dynamic tunability of phase-change material transition temperatures using ions for thermal energy storage" Cell Reports Physical Science vol. 2, Issue 10, Oct. 20, 2021, 100613.

* cited by examiner

THERMAL ENERGY STORAGE WITH PHASE CHANGE MATERIALS HAVING AN ADJUSTABLE TRANSITION TEMPERATURE

RELATED APPLICATIONS

This application claims priority to U.S. Provisional Patent Application No. 63/240,497, filed Sep. 3, 2021, which is herein incorporated by reference.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to thermal energy storage and more particularly to phase change materials having an adjustable transition temperature for thermal energy storage.

BACKGROUND

Deeper penetration of renewable electricity is only possible by further developing scalable, affordable, and sustainable energy storage. Since no single solution can satisfy all of the diverse application needs to decarbonize the world, various types of energy storage technologies, such as electrochemical, thermal, and mechanical, are under investigation. Phase-change material (PCM)-based thermal energy storage (TES) is of particular interest in many applications, such as buildings and thermal textiles, to provide localized and personalized cooling/heating, dry cooling of power plants to conserve water by using the diurnal swing of ambient temperature, thermal management of batteries and microelectronics, and transportation of foods, pharmaceuticals, and medical supplies. In all of these applications, the PCM works near the ambient temperature and is typically designed to operate at a fixed temperature.

One fundamental challenge in the adoption of PCM-based TES is that there is limited tunability in the usage temperature. Unlike an electrochemical energy storage device where the voltage is fixed, as with a Li-ion battery, the variation in ambient temperature means that the thermal voltage (i.e., the temperature) is not fixed for the near-ambient applications mentioned above. For example, the use temperature during summer and winter months (FIG. 1A) can vary significantly (there can be also significant diurnal variations). In reality, that translates into reduced use of the PCM, because either the PCM melts partially or does not melt at all. To solve this problem, use of multiple combined PCMs with different melting temperatures has been proposed, which increases the cost.

SUMMARY

One innovative aspect of the subject matter described in this disclosure can be implemented in a device including a phase change material, a salt dissolved in the phase change material, and an anode and a cathode disposed in the phase change material.

In some implementations, the device further comprises a separator disposed between the anode and the cathode. In some implementations the separator comprises a polymer separator. In some implementations, the separator is a separator selected from a group of a polypropylene separator and a polyvinylidene fluoride (PVDF) separator.

In some implementations, when a voltage is applied to the anode and cathode, cations of the salt are incorporated into or associated with the anode and anions of the salt are incorporated into or associated with the cathode, and a melting temperature of the phase change material increases. In some implementations, the voltage applied to the anode and the cathode is about 2.5 volts (V) or less.

In some implementations, the phase change material comprises poly(ethylene glycol) (PEG). In some implementations, the salt is a lithium salt. In some implementations, the salt is a lithium salt from a group of lithium oxalatodifluoroborate (LiODFB), lithium bis(trifluoromethanesulfonyl)imide (LiTFSI), lithium iodide (LiI), cesium bis(trifluoromethanesulfonyl)imide (CsTFSI), and 1-butyl-1-methylpyrrolidinium bis(trifluoromethylsulfonyl)imide-PEG ($Pyr_{14}$TFSI-PEG). In some implementations, a concentration of the salt in the phase change material when the salt is dissolved in the phase change material is about 5 mol % to 50 mol %.

In some implementations, the anode comprises lithium titanium oxide ($Li_4Ti_5O_{12}$, LTO). In some implementations, the cathode comprises a material from a group of a composite of a polyaniline (PANI) conductive polymeric material and carbon black and a composite of poly(3,4-ethylenedioxythiophene) (PEDOT) and carbon nanotubes.

In some implementations, the device is a thermal energy storage device.

Another innovative aspect of the subject matter described in this disclosure can be implemented in a method including providing a device. The device comprises a phase change material, a salt dissolved in the phase change material, and an anode and a cathode disposed in the phase change material. The phase change material changes from a solid to a liquid at a first temperature when the salt is dissolved in the phase change material. A voltage is applied to the anode and the cathode to substantially remove the salt from the phase change material. The phase change material changes from the solid to the liquid at a second temperature when the salt is substantially removed from the phase change material, with the first temperature being a lower temperature than the second temperature.

In some implementations, the method further comprises removing the voltage from the anode and the cathode to dissolve the salt in the phase change material. The phase change material changes from the solid to the liquid at the first temperature when the salt is dissolved in the phase change material.

In some implementations, the salt is dissolved in the phase change material when the device is in a first ambient temperature and the salt is substantially removed from the phase change material when the device is in a second ambient temperature, with the first ambient temperature being a lower temperature than the second ambient temperature. In some implementations, the first ambient temperature occurs at night time and the second ambient temperature occurs at day time. In some implementations, the first ambient temperature occurs in winter time and the second ambient temperature occurs in summer time.

In some implementations, when the voltage is applied to the anode and the cathode, cations of the salt are incorporated into the anode and anions of the salt are incorporated into the cathode. In some implementations, the voltage applied to the anode and the cathode is about 2.5 volts (V) or less.

In some implementations, the phase change material comprises poly(ethylene glycol) (PEG). In some implementations, the salt is a lithium salt. In some implementations, the salt is a lithium salt from a group of lithium oxalatodifluoroborate (LiODFB), lithium bis(trifluoromethanesulfonyl)imide (LiTFSI), lithium iodide (LiI), cesium bis(trifluoromethanesulfonyl)imide (CsTFSI), 1-butyl-1-methylpyrrolidinium bis(trifluoromethylsulfonyl)imide-PEG ($Pyr_{14}$TFSI-PEG). In some implementations, a concentration of the salt in the phase change material when the salt is dissolved in the phase change material is about 5 mol % to 50 mol %.

In some implementations, the anode comprises lithium titanium oxide ($Li_4Ti_5O_{12}$, LTO). In some implementations, the cathode comprises a material from a group of a composite of a polyaniline (PANI) conductive polymeric material and carbon black and a composite of poly(3,4-ethylenedioxythiophene) (PEDOT) and carbon nanotubes.

In some implementations, the device further comprises a separator between the anode and the cathode. In some implementations, the separator comprises a polymer separator. In some implementations, the separator is a separator selected from a group of a polypropylene separator and a polyvinylidene fluoride (PVDF) separator.

In some implementations, the device is a thermal energy storage device.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 2A shows DSC thermograms of LiODFB-PEG samples with concentrations ranging from 0 to 47 mol % measured at a ramp rate of 10° C. $min^{-1}$, as encoded in the caption by the 2-digit number before LiODFB. FIG. 2B shows a DSC thermogram and running enthalpy for 47LiODFB-PEG. The crosses on the thermogram that curve from left to right represent $T_{10}$, $T_{50}$, and $T_{90}$, respectively. FIG. 2C shows $T_{50}$ of salt-PEG system with identical cation and different anion sizes. FIG. 2D shows $T_{50}$ of salt-PEG system with different cation sizes and identical anion. FIG. 2E shows the interaction parameter of the different salt-PEG systems as a function of $r_{cation}/r_{anion}$. FIG. 2F shows a comparison of the $T_{10}$ (signifying onset of melting) and phase-change enthalpies of the LiODFB-PEG samples. The addition of LiODFB depresses both $T_m$ and phase-change enthalpy of PEG with increasing salt concentrations; from 27.6° C. to 15.5° C. and 137.1 to 88.8 J $g^{-1}$ in neat PEG and 47LiODFB-PEG, respectively.

FIG. 3A shows $T_{10}$ as a function of LiODFB-PEG composition (obtained using static experiments) with and without polymer separators. Samples with polymer separators were prepared by infiltrating melted LiODFB-PEG into either polypropylene Celgard or PVDF separators. Comparing these curves shows a decrease of 1.9° C. in the $T_{10}$ of neat PEG (zero salt concentration) upon infiltration into PVDF, compared to a decrease of 5.9° C. upon infiltration into Celgard. PVDF separators are used in the prototype devices (called PVDF standards hereafter) due to the larger $T_{10}$ swing as a function of LiODFB concentration, by 10° C. This tunability range for PVDF standards also is centered more usefully around ambient temperatures compared to the $T_{10}$ range of Celgard separators. FIG. 3B shows the galvanostatic profile for a cell cycled 10 times. The figure shows measured galvanostatic profile of the full cell cycled at a rate of C/4 with respect to the PANI electrode. Note that charge means that salts are being removed from the PEG and stored in the electrodes, and discharge means the opposite. Therefore, a charge capacity of zero means the highest salt concentration in the PEG. FIG. 3C shows $T_{10}$ of LiODFB-PEG-infiltrated PVDF separators in pre-conditioned (cycled 5 times) cells followed by a set voltage hold for 10 h, as determined by ex situ DSC on the harvested separators. FIG. 3D shows $T_{10}$ of LiODFB-PEG-infiltrated PVDF separators in voltage hold and cycled full cells as a function of estimated mole percent LiODFB, compared to the LiODFB-PEG PVDF standards. This series of cycled cells are labeled as follows: (a) cycled 19 times, charged to 2.49 V; (b) cycled 12 times, charged to 2.49 V; (c) cycled 11 times, charged to 2.35; (d) cycled 9 times, charged to 1.9 V; (e) cycled 9 times, charged to 1.1 V; (f) cycled 0 times, not charged. Charge capacity is converted to mole percent LiODFB in the PEG. $T_{10}$ from dynamic experiments match very well with the LiODFB-PEG PVDF standard results obtained using static experiments from (A). The lowest mole percent achieved in dynamic experiments was ~25%, as compared to 0% in static experiments.

DETAILED DESCRIPTION

Figure 1A:
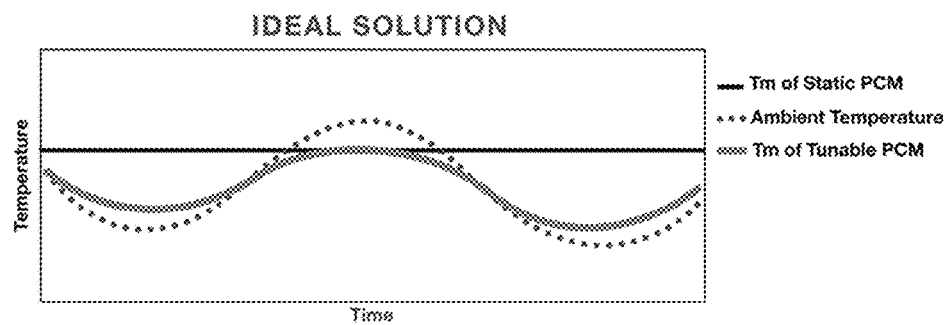
FIG. 1A shows a schematic depicting impact of changing ambient temperature (either diurnally or seasonally) on the utilization of static and tunable TES exposed to ambient temperatures. If the ambient temperature is too cold as compared to the transition temperature of the static PCM, then no phase change will take place. If the ambient temperature is too hot as compared to the transition temperature, then the PCM will very quickly change phase, melt, and remain in the molten state without providing much benefit. Therefore, ideally the transition temperature of PCM should be closely matched with the ambient temperature.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The terms "substantially" and the like are used to indicate that a value is close to a targeted value, where close can mean, for example, the value is within 80% of the targeted value, within 85% of the targeted value, within 90% of the targeted value, within 95% of the targeted value, or within 99% of the targeted value.

There has been significant interest in recent years in making thermal materials and devices tunable, such that their properties and performance can be dynamically changed. However, most of the focus has been on changing thermal transport properties, such as thermal conductivity, rather than thermodynamic properties, such as the melting/transition temperature ($T_m$) of a material. Changing the $T_m$ of a material dynamically using an external stimulus such as pressure, an electric field, or a magnetic field, is a non-trivial task, as the required magnitude of the stimulus to achieve a sizable change in $T_m$ is typically large, and the enthalpy change at $T_m$ is only moderate for thermal storage applications.

One recent example of transition temperature tuning involved the use of an optically controlled mechanism. In that work, the tuning was used to achieve different transition temperatures for charging the PCM with thermal energy and discharging the transition temperature; this enables a reduction of heat loss from the PCM and can eliminate the need for thermal insulation. However, to dynamically tune the transition temperature, in which both charging and discharging of thermal energy happens at the same temperature using nominal stimulus continuously, depending on the conditions, is still difficult. A recent commentary on five thermal energy grand challenges for decarbonization highlighted the development of tunable $T_m$ as one of its challenges.

Figure 1B:
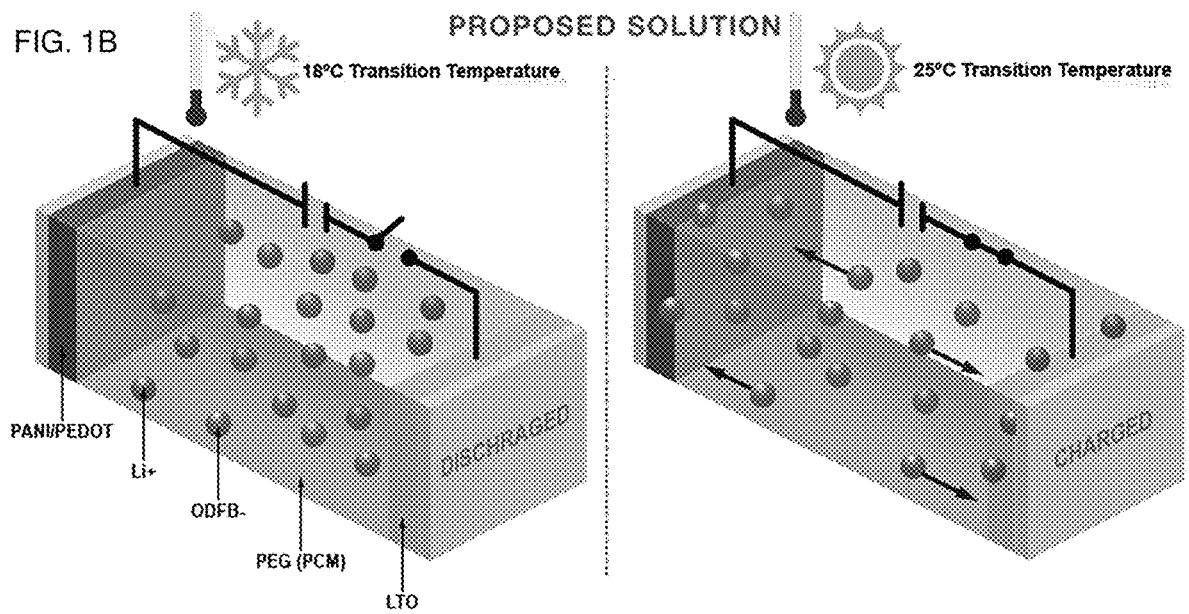
FIG. 1B shows a schematic of the dual-ion battery for dynamic tunability of the poly(ethylene glycol) (PEG) PCM TES described herein.

Herein, we describe the dynamic tunability of $T_m$ of a PCM using ions, with very modest voltage requirements. While it is known that the addition/removal of salt changes the melting temperature of a solution, dynamic modification of the salt concentration is nontrivial, and the requirement for reversibility and long-term cyclability precludes the use of physical or chemical separation techniques in modular applications. To overcome these challenges, we used a dual-ion battery (DIB) as shown in FIG. 1B to electrochemically modify the concentration of salt in a PCM and its $T_m$ in a reversible and dynamic manner. In a DIB, a PCM with a high initial salt concentration and low $T_m$ serves as the electrolyte for the device. Electrochemical charging stores the cations and anions in the negative and positive electrodes, respectively. This decreases the nominal salt concentration in the PCM/electrolyte itself, raising its $T_m$. The device can then be electrochemically discharged to reverse the process and lower the $T_m$ to its original value.

The state of charge (SOC) controls the magnitude of $T_m$. DIBs store cations and anions from the bulk electrolyte via redox reactions. This enables much higher charge storage capacities and greater changes to the salt concentration (i.e., $T_m$) of the bulk electrolyte in DIBs. The storage of ions via faradic reactions also reduces the self-discharge of the device and may obviate the need for a constant applied voltage to maintain a chosen $T_m$. It should be noted that DIBs are fundamentally different compared to rocking-chair devices (e.g., Li-ion batteries) in which cations (e.g., $Li^+$) are typically passed from one electrode to the other through the electrolyte upon charge or discharge. In such devices, electrochemical cycling does not change the bulk electrolyte concentration.

Figure 4:
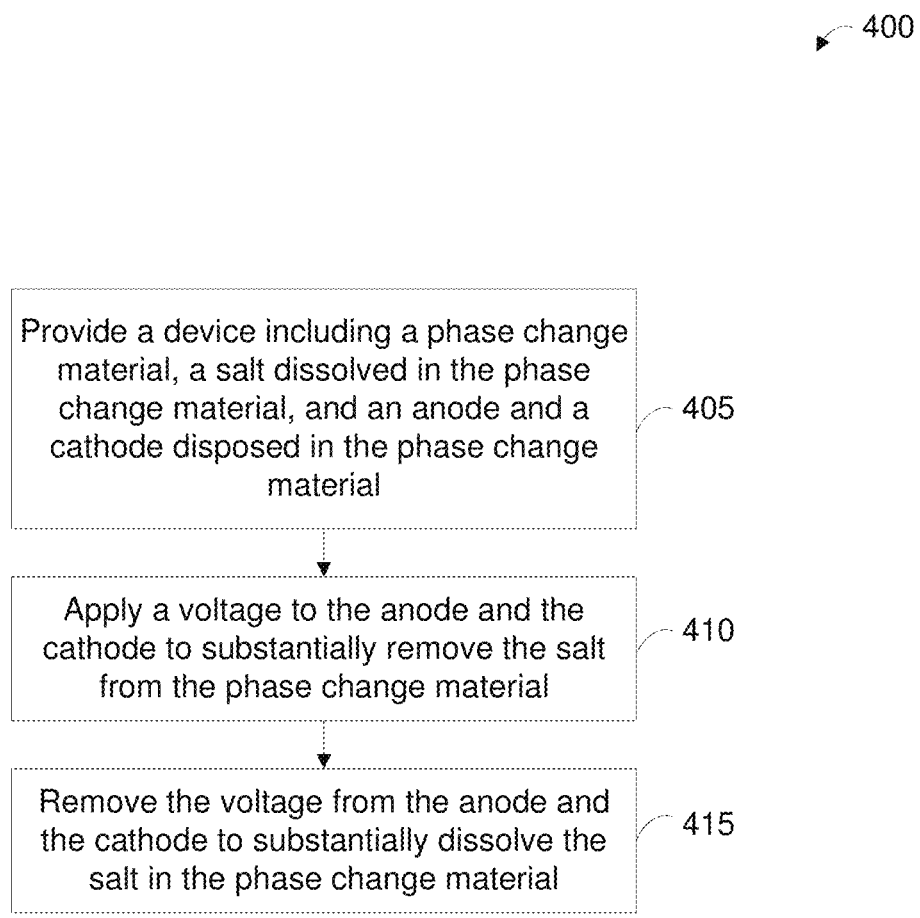
FIG. 4 shows an example of a flow diagram illustrating a process for using a phase change material having an adjustable transition temperature for thermal energy storage.

FIG. 4 shows an example of a flow diagram illustrating a process for using a phase change material having an adjustable transition temperature for thermal energy storage. Starting at block 405 of the process 400, a device operable to perform the process is provided.

Figure 5:
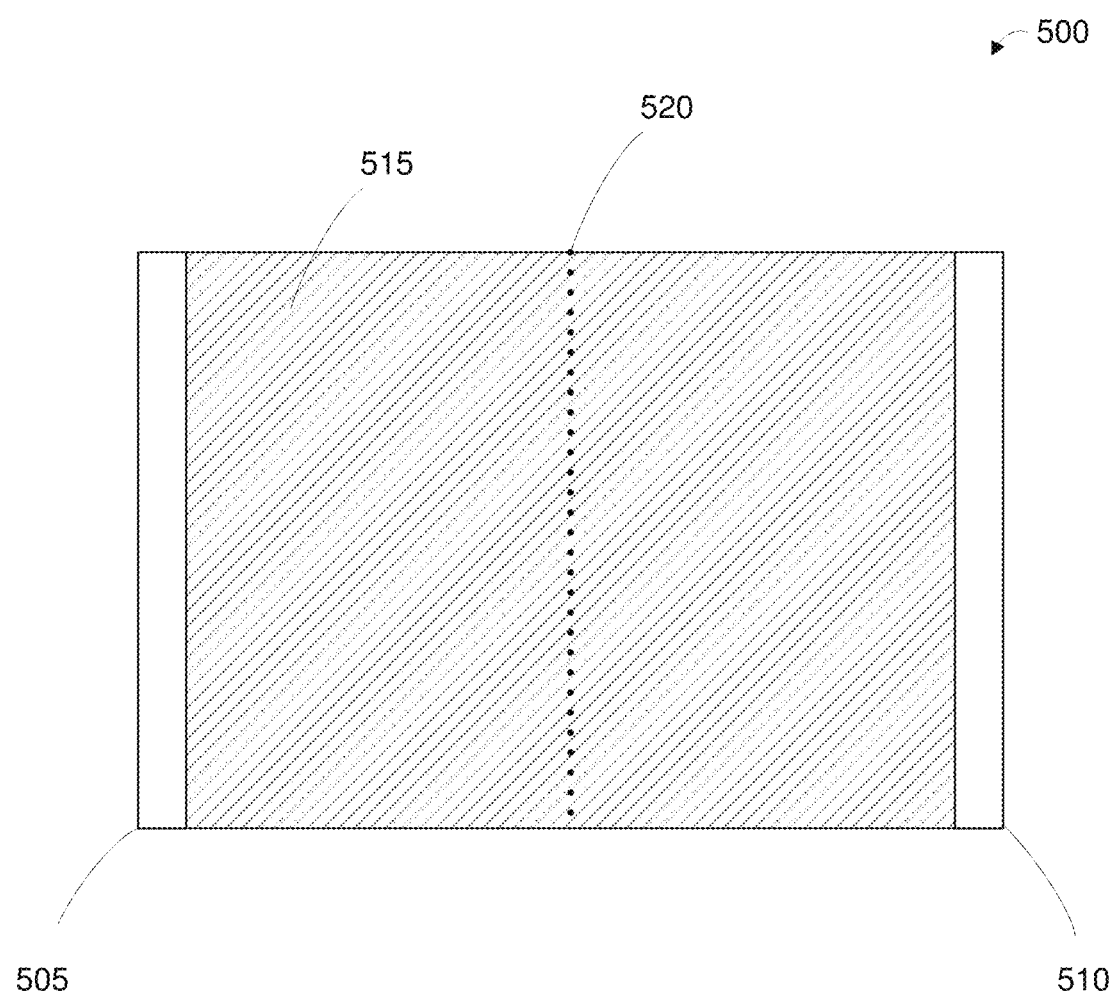
FIG. 5 shows an example of a schematic illustration of a device including a phase change material having an adjustable transition temperature for thermal energy storage.

Turning to FIG. 5, FIG. 5 shows an example of a schematic illustration of a thermal energy storage device. Embodiments of the device shown in FIG. 5 can be used to perform the process shown in FIG. 4. In some embodiments, a thermal energy storage device 500 includes a phase change material 515, a salt (not shown) dissolved in the phase change material 515, and an anode 505 and a cathode 510 disposed in the phase change material 515. In some embodiment, the device 500 further includes a separator 520 disposed between the anode 505 and the cathode 515. When the salt is dissolved in the phase change material, the phase change material changes from a solid to a liquid at a first temperature.

In some embodiments, the phase change material comprises poly(ethylene glycol) (PEG). In some embodiments, the molecular weight ($M_n$) of the PEG is about 1,000 g mol$^{-1}$.

In some embodiments, the salt is a lithium salt. In some embodiments, the salt is a lithium salt from a group of lithium oxalatodifluoroborate (LiODFB), lithium bis(trifluoromethanesulfonyl)imide (LiTFSI), lithium iodide (LiI), cesium bis(trifluoromethanesulfonyl)imide (CsTFSI), and 1-butyl-1-methylpyrrolidinium bis(trifluoromethylsulfonyl) imide-PEG ($Pyr_{14}$TFSI-PEG). In some embodiments, a concentration of the salt in the phase change material when the salt is dissolved in the phase change material is about 5 mol % to 50 mol %.

In some embodiments, the anode comprises lithium titanium oxide ($Li_4Ti_5O_{12}$, LTO). In some embodiments, the cathode comprises a material from a group of a composite of a polyaniline (PANI) conductive polymeric material and carbon black and a composite of poly(3,4-ethylenedioxythiophene) (PEDOT) and carbon nanotubes.

In some embodiments, the separator comprises a polymer separator. In some embodiments, the separator is a separator selected from a group of a polypropylene separator and a polyvinylidene fluoride (PVDF) separator.

Returning to FIG. 4, at block 410 a voltage is applied to the anode and the cathode to substantially remove the salt from the phase change material. In some embodiments, the voltage applied to the anode and the cathode is about 2.5 volts (V) or less.

When the salt is substantially removed from the phase change material, the phase change material changes from the solid to the liquid at a second temperature, with the first temperature being a lower temperature than the second temperature. In some embodiments, when the salt is substantially removed from the phase change material, the salt is incorporated into or associated with the anode and the cathode. Anions of the salt are incorporated into (e.g., intercalated or absorbed) or associated with the cathode.

Cations of the salt are incorporated into (e.g., intercalated or absorbed) or associated with the anode.

At block 415 of the method 400, the voltage is removed from the anode and the cathode to dissolve the salt into the phase change material. The phase change material changes from the solid to a liquid at the first temperature when the salt is dissolved in the phase change material.

Changing the temperature at which the phase change material changes from a solid to a liquid allows the phase change material to be used in different ambient temperatures. In some embodiments, the salt is dissolved in the phase change material at blocks 405 and 415 when the device is in a first ambient temperature, the salt is substantially removed from the phase change material at block 410 when the device is in a second ambient temperature, and the first ambient temperature is lower than the second ambient temperature. For example, in some embodiments, the first ambient temperature occurs at night time, and the second ambient temperature occurs at day time. In some embodiments, the first ambient temperature occurs in winter time, and the second ambient temperature occurs in summer time.

A phase change material without an adjustable transition temperature bounds its use to a specified temperature range. Consequently, thermal energy storage (TES) for a building using such phase change material cannot adapt to the variable ambient temperature and wide-ranging comfort needs for occupants. Without the ability to change the transition temperature of a phase change material, the use of the phase change material may be limited to a single season (e.g., to the winter time for heating or to the summer time for cooling).

The following examples are intended to be examples of the embodiments disclosed herein, and are not intended to be limiting.

Example—PCM Selection

For a DIB to work as a dynamically tunable TES device, there are three components—PCM, salt, and electrodes—that need to be selected and manipulated for the best performance. Here, we detail our selection criteria and design rules for the PCM selection. Several requirements guide the selection of the PCM for dynamic tunability of the $T_m$: (1) moderate to large enthalpy change at $T_m$; (2) the ability to solvate salts and provide sufficient ionic conductivity for electrochemical device operation; (3) sufficiently low electronic conductivity so that self-discharge through the material is minimized; and (4) the $T_m$ of the PCM should be close to room temperature (room temperature is about 20° C. to 25° C.) so that the tunable range of $T_m$ is relevant for near-ambient applications. Polyethylene glycol (PEG) has an enthalpy change of ~100-150 kJ/kg, satisfies the electrical considerations, and has been explored as a polymer electrolyte for batteries. While less commonly used for electrochemical applications, molecular weight ($M_n$) varieties of the polymer near 1,000 g mol$^{-1}$ possess $T_m$ near room temperature. PEG with $M_n$~1,000 g mol$^{-1}$ is thus suited as an electrochemically compatible PCM for the dynamic tunability of the $T_m$, and was used exclusively in this study.

Example—Salt Selection

To develop design rules for optimal salt-PEG systems that maximize $T_m$ tunability and lead to stable solutions, we conducted experiments with five salts: Li oxalatodifluoroborate (LiODFB), LiI, Li bis(trifluoromethanesulfonyl)imide (LiTFSI), CsTFSI, and 1-butyl-1-methylpyrrolidinium bis(trifluoromethylsulfonyl)imide-PEG (Pyr$_{14}$TFSI-PEG). Static experiments in which the thermodynamic properties (enthalpy change and $T_m$) were measured for different concentrations of these various salts-PEG systems were performed to help design the dynamic experiments using DIB.

Figures 2A, 2B:
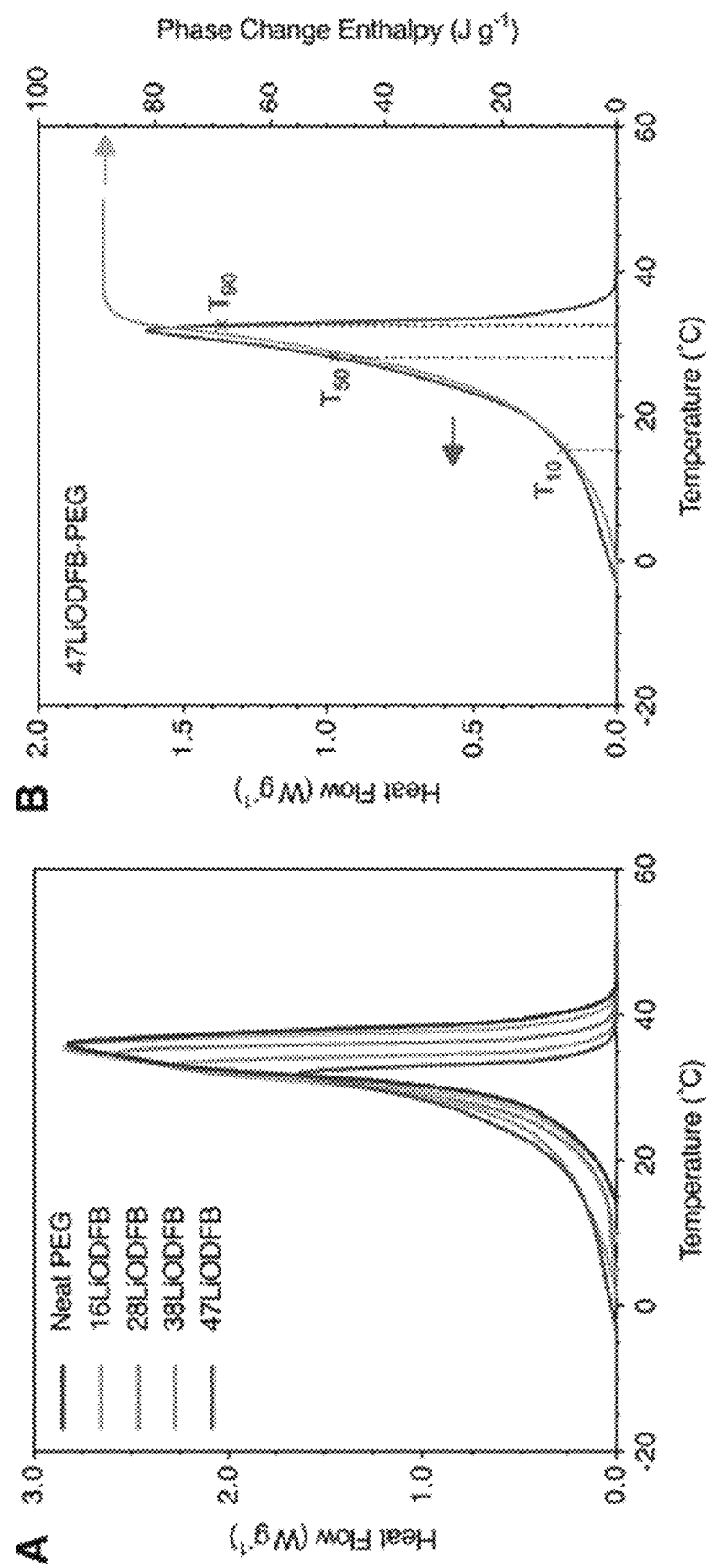
FIGS. 2A-2F show thermal measurements results of the impact of ions on the thermophysical properties of the PEG-based PCM.

Differential scanning calorimetry (DSC) thermograms of the LiODFB-PEG samples are shown in FIG. 2A. Increasing salt concentrations shifts the peak $T_m$ to lower temperatures. However, the broad transition peaks make the typical determination of the onset temperature via extrapolation of the peak tangent inappropriate, as it neglects partial melting of the material at lower temperatures. Instead, the temperature corresponding to a prescribed fraction of the total enthalpy of phase transition better characterizes the system. For salt selection, the temperature corresponding to 50% of the total enthalpy change (referred to as $T_{50}$) was used (FIG. 2B). Similarly, $T_{10}$ denotes the temperature corresponding to 10% of the total enthalpy change. The $T_{50}$ transition temperatures were used to better understand the changes in the bulk melting rather than the onset temperatures. The broad transition peaks observed via DSC (e.g., $T_{10}$-$T_{90}$ ranging from −10° C.-17° C. for LiODFB-PEG in FIG. 2A), indicate a distribution of melting temperatures and/or slow kinetics of phase transition.

Step scans were carried out to elucidate the nature of these broad transition peaks. The measurements confirmed that the breadth of the peak is not due to kinetic limitations, because the transformations remain incomplete even when the temperature is held above the $T_m$. Reconstructed thermograms from the step scans also closely followed the DSC thermograms measured at 10° C. min$^{-1}$, which indicates that the melting behavior of the samples is largely independent of the ramp rate. This suggests that the broad peaks are due to a distribution of melting temperatures, which is commonly encountered in polymers. While this can lead to inefficiencies in thermal energy storage applications, the transition peak breadth may be narrowed with the use of monodisperse PEG.

Figure 2D:
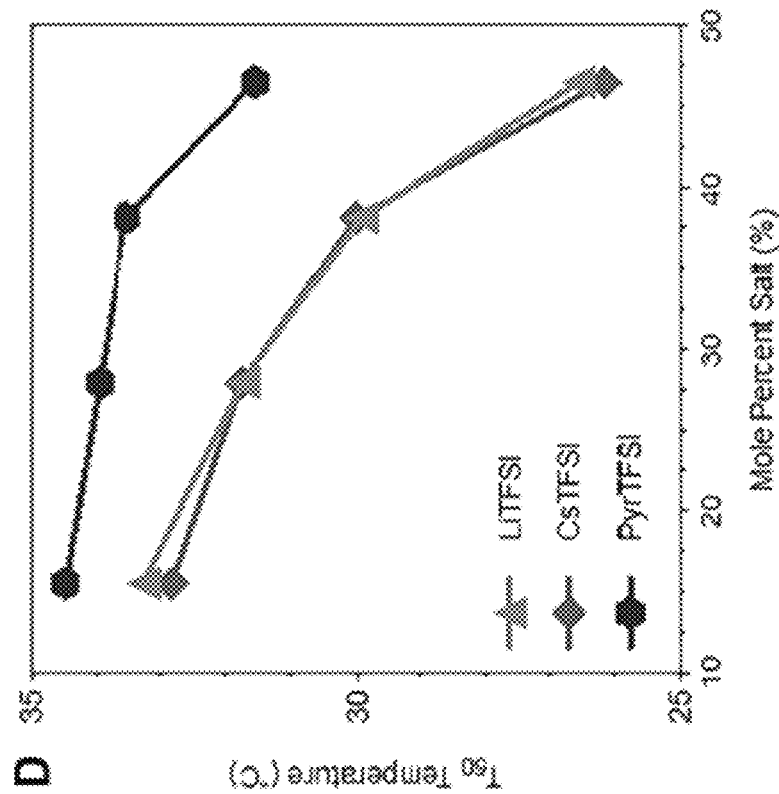
Figure 2C:
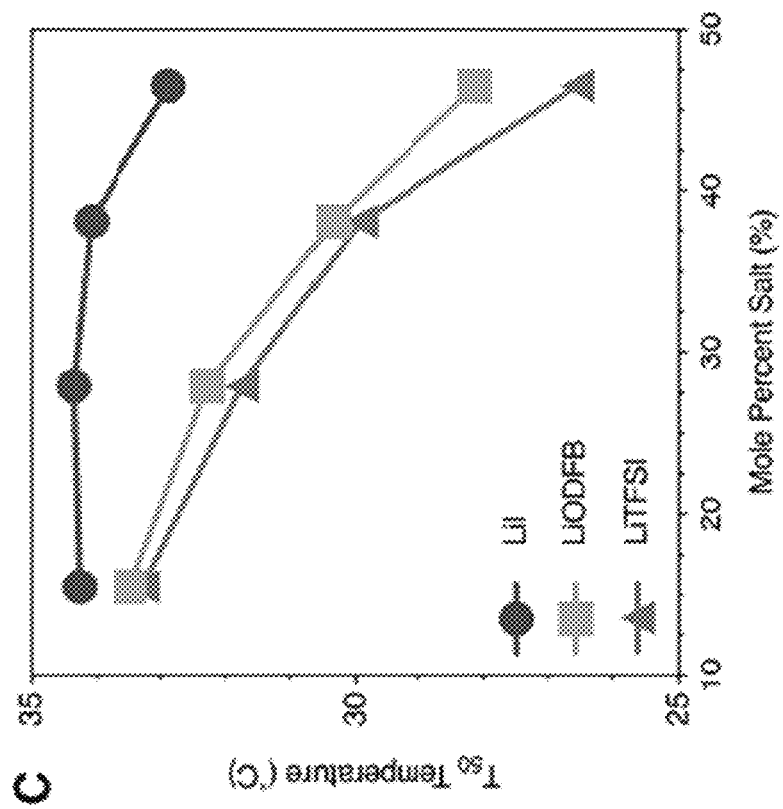

FIG. 2C shows an obvious decrease in $T_{50}$ with increasing anion size (where the size of I$^-$<<ODFB$^-$<TFSI$^-$), whereas there is no clear trend (FIG. 2D) for cation size (where the size of Li$^+$<Cs$^+$<<Pyr$_{14}^+$). The largest cation and anion pair in Pyr$_{14}$TFSI shows only a minor change in the transition temperature; similarly, the smallest pair (LiI) also shows only a very modest change in $T_{50}$.

Figure 2F:
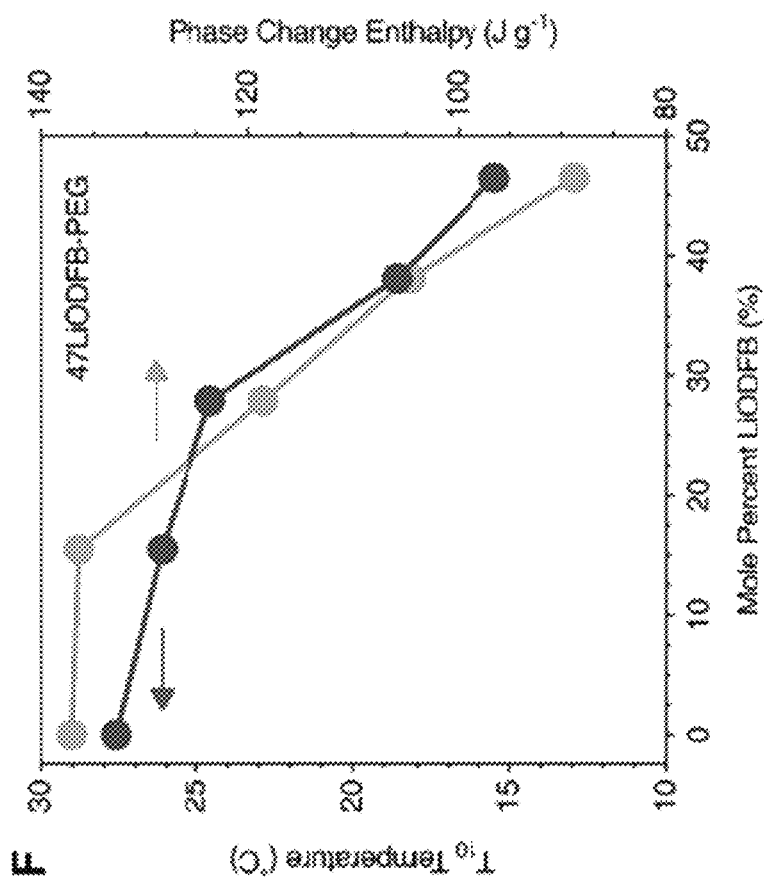
Figure 2E:
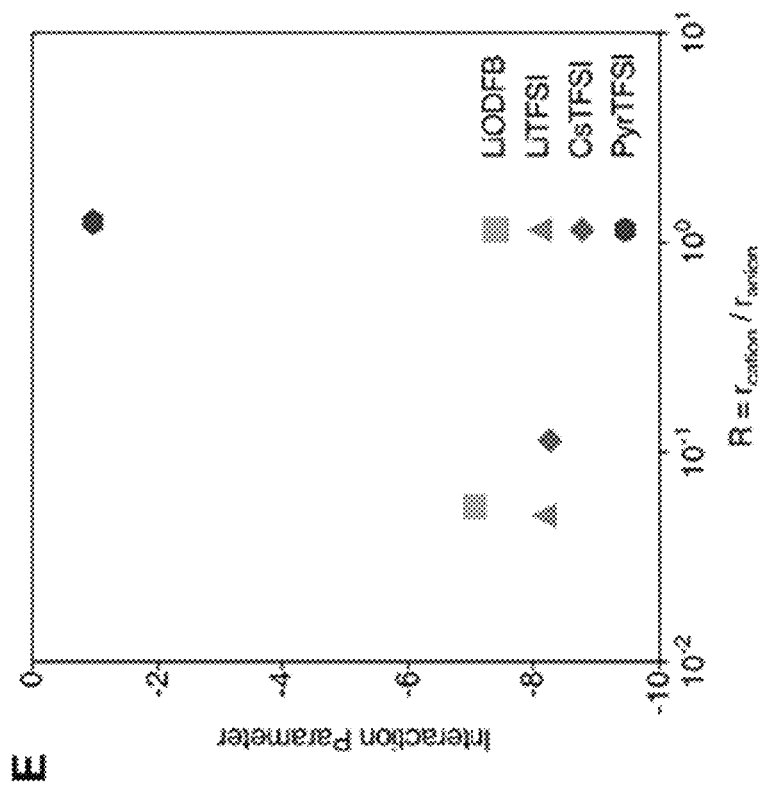

Flory-Huggins theory (FHT), which is used to understand the thermal properties of salt/polymer solutions, was applied here to provide additional context to the $T_{50}$ data. A large negative value of $\chi$ (the interaction parameter) in FHT means a higher solubility of the salt in the polymer, which is expected to lead to greater degrees of $T_m$ depression. FIG. 2E shows the fitted $\chi$ as a function of ratio (R=$r_{cation}$/$r_{anion}$) of cation to anion radii. The large $\chi$~−8 for alkali salts, LiODFB$^-$, LiTFSI$^-$, and CsTFSI$^-$ is supported by the formation of polyethylene oxide (PEO):X complexes observed in these systems. This indicates that smaller R may be better for $T_m$ control as it leads to larger $\chi$. Conversely, if R increases due to a relative increase in the cation size, $\chi$ becomes less negative (sometimes positive), leading to a decreased salt solubility and less sensitive $T_m$ depression. Both Pyr$_{14}$TFSI and LiI have larger values of R, resulting in less sensitivity of $T_m$ (FIGS. 2C and 2D).

As discussed, small R resulting in high solubilities of some alkali salts is important for maximizing the $T_m$ tunability of the PEG PCM. For the purposes of electrochemical modulation of the salt concentration in the PCM, the salt must also be compatible with the electrode chemistries and other system specifications. Of the Li salts investigated, LiODFB was chosen as the salt for a DIB device due to its high solubility, high thermal stability, and ability to passivate Al current collectors. Various LiODFB-PEG samples ranging from 0 to 47 mol % LiODFB were synthesized and characterized. Higher concentrations of LiODFB-PEG are liquid at room temperature and were omitted from further study.

$T_{10}$ (signifying the onset of melting) results are reported in the remainder of the description in this EXAMPLE and the following EXAMPLES. $T_{10}$ and enthalpies of transformation of the LiODFB-PEG samples are shown in FIG. 2F. The addition of LiODFB is shown to depress both the $T_m$ and phase-change enthalpy of PEG with increasing salt concentrations. A similar trend in the phase-change enthalpy with increasing salt concentration was previously observed in the LiTFSI-PEO system. The loss in phase-change enthalpy with the incorporation of salt is due to a decreasing weight fraction of PEG in the salt-PEG system (the LiODFB salt itself does not contribute to the enthalpy of transition at the temperatures of interest). Nonetheless, over the composition range studied, the LiODFB-PEG system demonstrates a potential tunable $T_m$ window of $\Delta T_{10}=12.1°$ C. and highlights the validity of using salt to modulate the thermal properties of a PCM.

Example—Electrode Selection and Electrochemical System Engineering

Over the past 40 years, the PEO electrolyte-based solid-state battery (SSB) has advanced to the point that it may power electric vehicles for hundreds of miles per charge, and can withstand thousands of charge/discharge cycles over a lifetime of nearly 10 years. (Note that high-molecular-weight PEG is commonly referred to as PEO; this study uses low to medium molecular weight, referred to as PEG).

Two distinctive challenges differing from SSB are highlighted here, leading to our unique material choices and device architectures. For tunable PCM, enthalpy change during thermal transition is more critical, as it is enthalpy change that decides the thermal energy density, whereas for batteries, higher voltage is more important, as it is voltage that determines the electrical energy density. In tunable TES, the voltage is used as a stimulus to insert ions to change $T_m$. Therefore, low voltage is preferred for the tunable TES device.

The low voltage of ≤2.5 V is preferred for the PEG-based PCM, as PEG will chemically disintegrate above 3.8 V versus Li/Li$^+$, making PEG disadvantaged for battery applications but ideal for tunable TES applications. The electrode materials selection choices would be a lower potential cathode material, and a higher potential anode material, to yield a low-voltage tunable TES device that has thermodynamically stable interfaces to ensure operational longevity. In this case, Li titanium oxide Li$_4$Ti$_5$O$_{12}$ (LTO) was selected as an anode active component to store and release Li ions. LTO is a good choice as an anode material, as its operational potential is flat ~1.55 V versus Li/Li$^+$. The PEG-based PCM electrolyte is both electrochemically and chemically stable toward LTO at this potential to ensure a thermal dynamically stable interface-therefore, no interfacial decay over the long period of operation.

The conventional Li-ion or Li-PEG polymer battery is operated well below the stability limit (0.8 V versus Li/Li$^+$) of the PEG electrolyte. As reported, most of the Li-ion battery decay comes from the low potential anode and electrolyte interface failures, due to the solid electrolyte interphase (SEI) formation and breakdown over the lifetime of the battery. Rechargeable batteries based on LTO anodes have demonstrated millions of cycles with very little interface and materials decay. The unique low voltage requirements of the tunable TES device make the LTO a good anode choice. Since electrical energy storage is not a paramount requirement for the tunable TES device, the overall cell voltage is preferably low for simple operation. Low-potential cathodes, which are out of favor for battery applications, are preferred here to achieve the low-voltage tunable TES device; lower potential cathodes (below 3.8 V operational potential) stay within the electrochemical and chemical stability window of the PEG electrolyte to significantly improve the long-term stability of the TES device. In addition, the PCM PEG electrolyte may have much higher oxidation stability-up to 4.5 V Li/Li$^+$ at a higher salt concentration of 47% LiDOBF. This higher voltage stability opens up new possibilities for other high-capacity cathode materials for the tunable PCM device, and may provide better electrical energy storage capability. Although the tunable TES device is an electrochemical cell, unlike the Li-ion battery operated beyond the thermal dynamic stability window of its electrolyte, the tunable TES device can use materials within their thermal dynamic stability window during device operation, so it can have a much longer life and perform more cycles compared to that of the best Li-ion battery.

The second major difference is that the cathode needs not to intercalate and de-intercalate Li cations, compared to the Li rechargeable battery, but to absorb and release anions of the corresponding salt in the PCM electrolyte (FIG. 1B). In most of the Li-ion batteries, a transition metal oxide cathode is used to house Li cations; among the transition metals, Ni and Co are the primary choices. In the DIB design for the tunable TES device, the Li salt needs to be removed from or released to the PCM electrolyte during cycling. Since the LTO anode is housing Li cations, the cathode is used to host anions such as ODFB$^-$. The function of the cathode can be achieved by a redox active polymer instead of transition metal oxide-based ceramic materials. The advantages of using redox polymers are many, including lower potentials of redox activities to achieve a lower device voltage and better PCM stability, no use of constrained resource materials, and a large variety of choices of redox materials based on the diverse carbon chemistries, as well as easy processing into film laminate and device integration. However, redox polymers are not without challenges; as compared to ceramic materials, organic redox materials are prone to isomerize and transform during repeat oxidation and reduction.

Figures 3A, 3B:
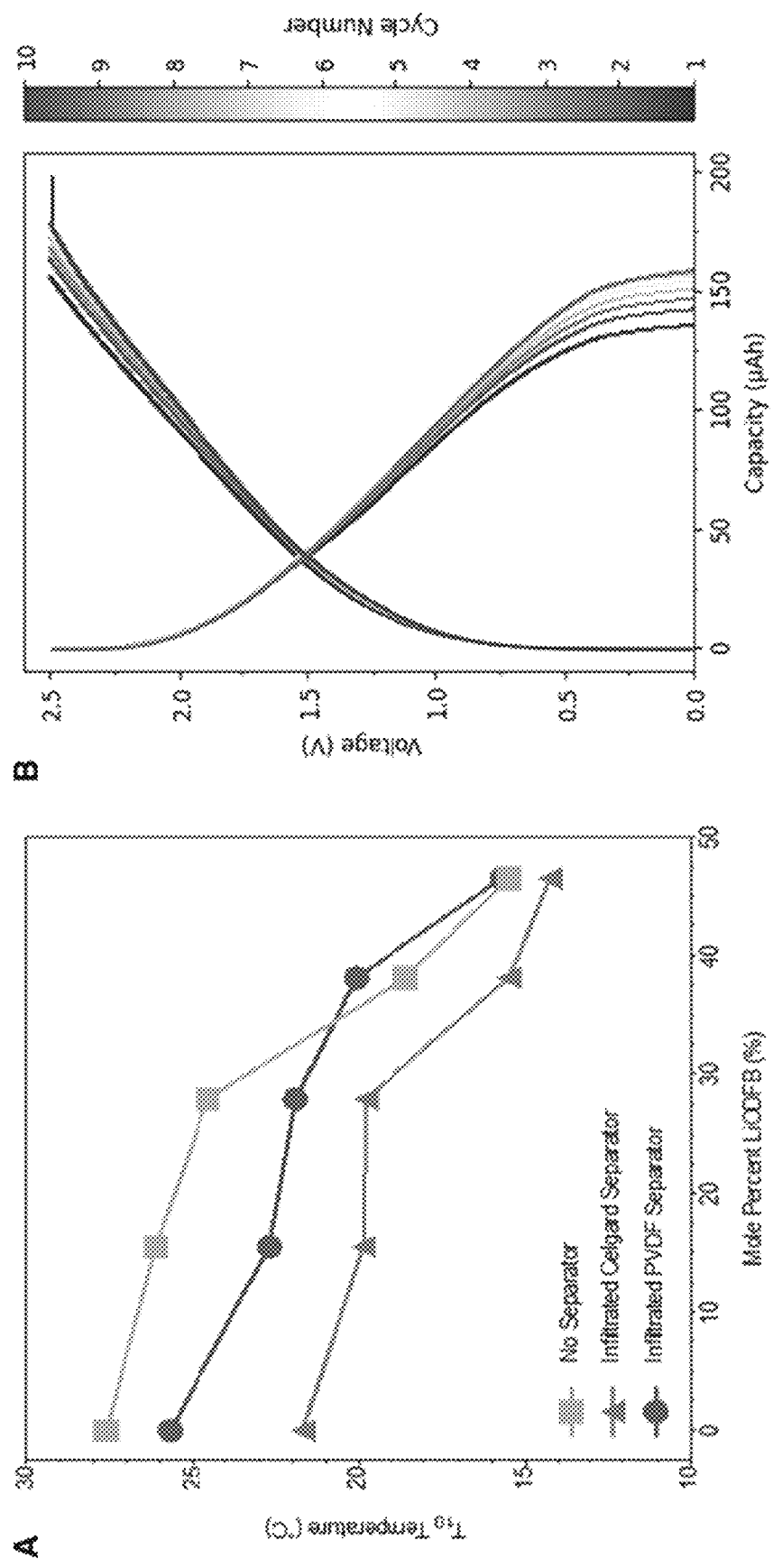
FIGS. 3A-3D show the results of the use voltage or capacity dial to tune the $T_m$ of the PCM based on dynamically tunable TES device via a dual-ion battery chemistry.

In line with this, two types of redox organics were used and are reported here. One is the polyaniline (PANI) conductive polymer material. The PANI is low cost, is made in commercial scale, has lower oxidation potential, and is stable toward oxidation. The PANI-carbon black-based anode electrode demonstrates excellent capacity stability toward oxidation and reduction during the >70 cycles tested (FIG. 3B). The initial capacity improvement is due to the continuous wetting of the PANI cathode materials by PEG electrolyte to improve the anion accessibility to the oxidation sites of the PANT. The PANI electrode potential also stabilizes after the initial cycling; extended cycling is being tested to further gauge its performance.

Another redox material, poly(3,4-ethylenedioxythiophene) (PEDOT), was also tested for the cathode application. The PEDOT-carbon nanotube electrode functions similarly to the PANI-CB electrode to reversibly oxidize and host ODFB⁻. However, compared to the PANI, the PEDOT is less stable with the PCM electrolyte. The performance differences between the two organic redox cathodes demonstrate not only the universal feasibility of the DIB approach for tunable PCM applications but also that there is more materials engineering to be done to achieve superb PCM device stabilities.

Example—Demonstration of Dynamic Tunability Using DIB

With the salt selection specified from the static experiments and electrode couple selection from electrochemical evaluation, here we discuss our experiments that show the dynamic tunability of $T_m$ using ions in a DIB. The DIB (FIG. 1) comprises an LTO⁻ electrode, a PANI-CB⁺ electrode, and 47LiODFB-PEG infiltrated into a polymer separator (not shown in FIG. 1B) for mechanical support. While graphite-graphite symmetric cells are often used in DIBs, the potentials required for Li⁺ and anion intercalation into graphite (0.01 and ~5 V versus Li/Li⁺, respectively) induce significant electrochemical degradation of the polymer electrolyte. Initial investigations of potential electrodes also showed the undesirable co-intercalation of the PEG with Li⁺ into graphite. LTO was chosen as the negative electrode due to its higher redox potential for Li⁺ intercalation (1.55 V versus Li/Li⁺, which is within the electrochemical stability window of PEG), and the inability of PEG to co-intercalate into its crystal structure. PANI was similarly chosen as the positive electrode due to the lower redox potential for anion doping (<3.8 V versus Li/Li⁺), and carbon black was used to increase electronic conductivity. PANI is a conjugated polymer that is able to accommodate cations or anions through an electrochemical doping/de-doping process via redox of the aniline moieties along the polymer backbone at low and high potentials, respectively. An upper voltage limit of 3.4 V versus Li/Li⁺ was implemented for the PANI-CB electrode to reduce the electrochemical oxidation of PEG in the device (~3.8 V versus Li/Li⁺). To compensate for the low specific capacity of 40-60 mAh g⁻¹ for the PANI, high mass loading electrodes were fabricated using stainless-steel mesh current collectors. Cells were also constructed using alternative electrode materials, including PEDOT and carbon nanotubes (CNTs) to demonstrate customizability of the system to optimize the DIB. The PEDOT-CNT demonstrated significant tunability, but lacked high efficiencies and economic feasibility. Therefore, only the PANI-CB results are shown here.

A polymer separator was used to provide mechanical support and prevent short-circuiting of the electrodes, but it can also affect the thermal properties of the device, and therefore needs to be carefully selected. $T_{10}$ of the different LiODFB-PEG compositions (obtained using static experiments) with and without polymer separators are shown in FIG. 3A. A polypropylene Celgard separator (40 µm thick, 20 nm pore diameter) lowers the transition temperature of LiODFB-PEG across the entire composition range studied. A polyvinylidene fluoride (PVDF) separator (125 µm thick, 220 nm pore diameter) also contributes to a lowering of the $T_{10}$, but to a lesser extent. It is hypothesized that the pores of the polymer separators restrict the size of the crystalline domains of PEG, and the smaller resultant domains possess lower melting points. The 220-nm pores of the PVDF separator thus influence the transition temperature to a lesser extent than the 20-nm pores of the Celgard separator. PVDF separators are used in the prototype DIB devices due to the larger range of $T_{10}$ as a function of salt concentration seen in these static tests. The LiODFB-PEG infiltrated PVDF separator samples are used to compare the thermal properties of the dynamically tuned PCM, and are hereafter referred to as PVDF standards.

The maximum operating voltage of the full cells was determined from the half-cell characterization of the LTO and PANI electrodes. The capacity of the PANI electrode is limiting and allows for the use of the lithiation plateau of LTO to pin the full-cell upper voltage limit to 2.5 V. A representative galvanostatic profile of a full cell cycled at a rate of C/4 with respect to the PANI electrode is shown in FIG. 3B. The Coulombic efficiency in the full cells increased steadily with cycling but plateaued to ~90% after 5 cycles. Low efficiencies were also observed in LTO-based Li-ion batteries, and are attributed to side reactions of carbonate-based electrolytes catalyzed by $TiO_2$ impurities and/or the LTO surface. However, the nature and extent of these reactions with PEG polymer electrolytes is not well understood.

Figure 3C:
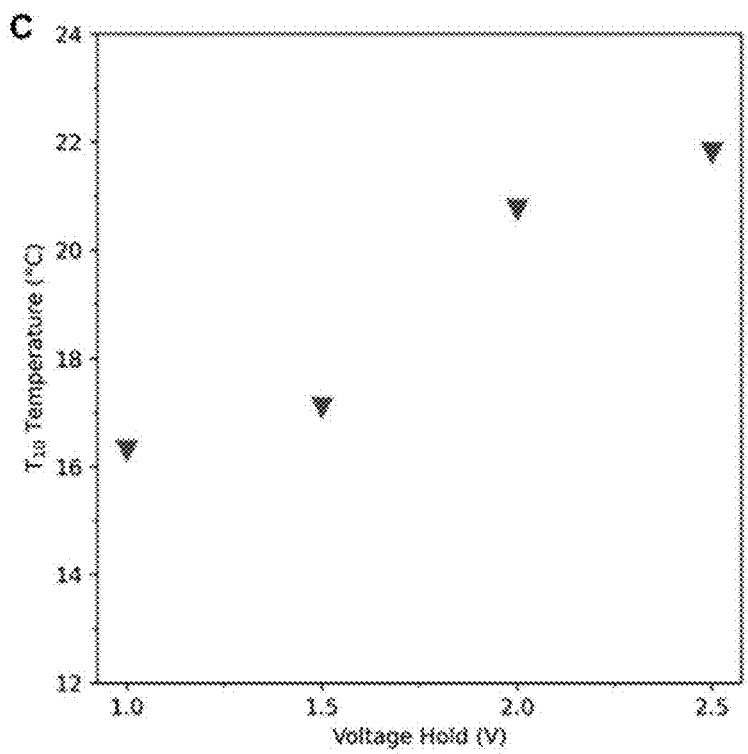
Figure 3D:
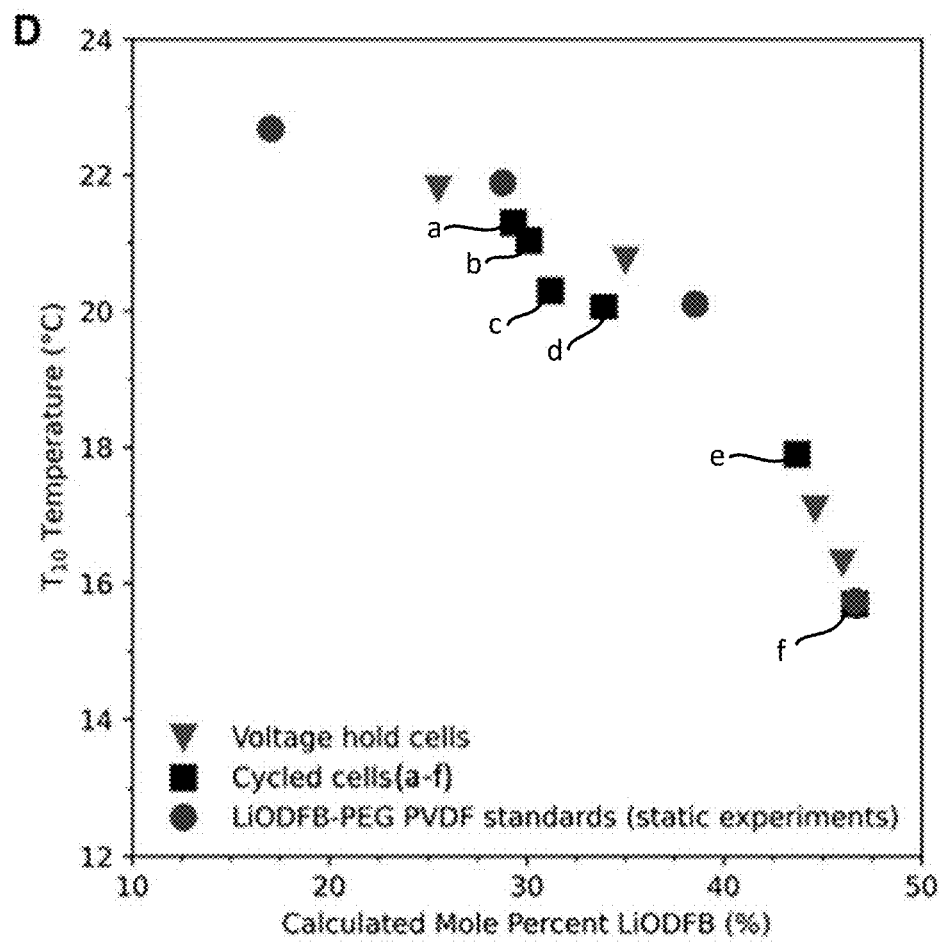

Ex situ thermal characterization was performed on the LiODFB-PEG-infiltrated PVDF separators harvested from full cells charged to different capacities (or SOCs). $T_{10}$ as a function of voltage holds (and associated charged capacity) of the cells is shown in FIG. 3C for the LTO/PANI-CB device. For comparison, $T_{10}$ as a function of voltage holds an associated charged capacity for the LTO/PEDOT-CNT device. Very modest applied voltages (<2.5 V) performed after conditioning the system for 5 cycles resulted in a $T_{10}$ swing of nearly 6° C. FIG. 3D shows the same data as in FIG. 3C, but as a function of LiODFB-PEG composition in the separator and with additional data points (static experiment standards and more cycled cells) for reference. Cells cycled 15-25 times between 0 and 2.5 V at C/4 were harvested at various points to determine the impact of multiple cycling on $T_m$. The $T_{10}$ from the dynamic experiments, both voltage holds and cycling, match closely with $T_{10}$ from static experiments. Fully discharged cells after conducting the cycling experiments show an average $T_{10}$ of 16.3° C. that closely match the average $T_{10}$ of 15.7° C. for the 47LiODFB-PEG PVDF standards from static experiments (FIGS. 3A and 3D at 47 mol %). This value is close to that which is expected, given the net zero change in the PCM salt concentration assumed in these devices. This indicates that the process of electrochemical cycling did not significantly alter the thermal properties of LiODFB-PEG, even considering the coulombic efficiency of cycling. Cycled cells with <30 mol % LiODFB did display a slightly smaller $T_{10}$ than the corresponding standards, indicating that the salt extraction estimation for many cycled cells may have increased error.

However, the characterization of cycled cells shows the expected general trend of $T_{10}$ dependence on SOC. Cycled cells were harvested with charged capacities between 0 and 202 µAh and demonstrated a total $T_{10}$ swing of >5° C.; these results are remarkable in that only quite modest voltages (~2 V) were used to achieve this tunability of phase transition temperature, which has technological implications as it will allow for simpler and safe system design. In practice, depending on the required $T_m$ (which, in turn, will depend on the changing ambient conditions and frequency with which $T_m$ change is required, e.g., diurnal versus seasonal), one can use the appropriate voltage based on data shown in FIG. 3C. The tunable PCM device is working at an ambient condition, in which the temperature of the electrodes fluctuates. Due to the thermogalvanic effect, the overall cell voltage can drift by a few hundred millivolts, depending on the ambient temperature at a given salt concentration in the PCM. To achieve precise control of the ion concentration, cell voltage needs to be calibrated and adjusted with ambient temperature.

Example—Energy Efficiency of the Device

The thermal and electrochemical energy of the prototype devices can be estimated from the cell build and electrochemical cycling. Considering cell a in FIG. 3D as a representative device, the electrically discharged cell (47 mol % LiODFB) has 16 mg LiODFB-PEG loaded in the PVDF separator and can store 1.4 J thermal energy via its phase transformation (FIG. 2F) with a $T_{10}$ of 15.5° C. (FIGS. 3C and 3D). The salt concentration is reduced in the PEG in the electrically charged state (~47 mol % LiODFB), and the cell has ~1.7 J (FIG. 2F) thermal energy storage with a $T_{10}$ of 22.0° C. (FIGS. 3C and 3D, cell a). The cell requires 1.4 J electrical energy to charge the device, and ~0.7 J electrical energy can be recovered upon discharge with a round-trip energy electrical efficiency of ~50%. For PEG-based electrolytes, most of the internal resistance comes from interface resistance, with only a small fraction from bulk materials resistance.

In the tunable TES device, a large amount of the PCM is needed to store thermal energy due in part to the high internal ohmic resistance, hence the low round-trip energy efficiency. The low round-trip energy efficiency is material specific. As in the PEDOT-CNT cathode system, the low round-trip energy efficiency comes from both higher internal ohmic resistance and low Coulombic efficiency of the DIB; the cell requires 0.9 J electrical energy to charge the device, but only ~0.2 J electrical energy can be recovered upon discharge with a round-trip electrical energy efficiency of only ~20%. Therefore, there is much room for improvement of the tunable TES device in enhancing the round-trip electrical energy efficiency. In addition, the self-discharge of a fully charged cell is 0.2 V over 12 h at 25° C. and may be reduced further by eliminating side reactions present in the device. As Li-ion batteries demonstrate slow self-discharge, the preliminary finding suggests that a constant applied voltage to the tunable TES device may ultimately not be necessary to maintain target transition temperatures for PCM applications.

The ΔH of pure PEO is 137.1 J/g and the melting point is 27.6° C. (FIGS. 2A-2F). The highest salt concentration 47% LiODFB is at the far end of the tunability, with ΔH of 88 J/g and a melting point of 15.5° C. At the 2 extremes between pure PEO and 47% LiODFB, the tunability is 12.1° C. (FIGS. 2A-2F), achieved in the static experiment in which ΔH is reduced by ~35%. In the dynamic experiment, a moderate concentration of 30% LiODFB (FIG. 3D, cells a-d) is used, in which ΔH is 120 J/g (FIG. 2A) (i.e., it decreases by only 12.5%). The salt does decrease the ΔH of the PCM, but it remains within a reasonable range. In a prototype device, there is no need for a separator, as the PCM itself can act as a physical barrier between the two electrodes. The addition of the salts and electrical energy storage electrodes added additional weight to the tunable PCM device; however, they also provided additional functions for reversible electrical energy storage.

The overall energy efficiency of electrochemically modulated TES also depends on the frequency of thermal cycling and electrochemical cycling. For example, the overall energy efficiency F for cell a in FIG. 3D for diurnal modulation of $T_m$ is ε≈50%, assuming a round-trip thermal storage efficiency of η=90% and a thermal energy capacity of $E_t$=1.7 J, whereas for the seasonal modulation of $T_m$, this increases to ε=89%. If the electrical energy can be recovered, then the overall energy efficiency for the diurnal case increases to ~72%.

Example—Polymer Electrolyte Synthesis

LiODFB, LiTFSI, LiI, CsTFSI, and $Pyr_{14}$TFSI were purchased and dried under vacuum at 120° C. for at least 12 h before storage in an Ar-filled glovebox (<1 ppm $O_2$/$H_2O$). PEG ($M_n$~1,000) was purchased and dried under vacuum at 60° C. for at least 12 h before glovebox storage.

$LiODFB^-$, $LiTFSI^-$, $LiI^-$, $CsTFSI^-$, and $Pyr_{14}$TFSI-PEG samples were prepared in an Ar glovebox to minimize moisture contamination of the hygroscopic salts and polymer. The respective salts were mixed with melted PEG at 60° C. in 15.5, 27.9, 38.1, and 46.5 mol % concentrations (equivalent to LiTFSI-PEG standards of 5, 10, 15, and 20 wt %, respectively) until a homogeneous solution was obtained. These salt-polymer concentrations are hereafter referred to using the mole percent as 16, 28, 38, and 47X-PEG, where X refers to the salt (e.g., 47LiODFB-PEG).

Example—Electrodes and Cell Fabrication and Electrochemical Characterization LTO electrodes were prepared using a doctor blade to cast a slurry of LTO, carbon black, and PVDF in n-methyl pyrrolidone with a weight ratio of 80:10:10 on carbon-coated aluminum foil. Polyaniline (emeraldine base, $M_n$ 50,000, and carbon black were thoroughly mixed before PANI-CB electrode fabrication. In a typical mixing, 100 mg polyaniline and 43 mg carbon black were added to a 200-mL ethanol solution. The materials were then sonicated until a homogeneous suspension was obtained (~1 h). The suspension was then centrifuged, and the product was dried in a vacuum oven at 70° C. for 12 h. PANI-CB electrodes for initial materials characterization and validation were prepared using a slurry of PANI-CB and PVDF in NMP with a weight ratio of 70:30. Higher mass loading PANI-CB electrodes for the electrochemical device prototypes were cast into 304 stainless-steel 100×100 mesh. Electrodes were dried in air for 12 h before drying at 120° C. under vacuum for at least 2 h. The areal mass loadings of LTO electrodes prepared using the doctor blade were 2-3 mg $cm^{-2}$, respectively. The areal mass loadings of the stainless-steel mesh PANI-CB electrodes were 7-10 mg $cm^{-2}$.

Electrochemical characterization was performed in 2032-coin cells using a potentiostat. Half-cells were assembled in an Ar glovebox using Li-metal counter electrodes, 125-μm-thick PVDF separators, and 47LiODFB-PEG. Before full-cell fabrication, LTO and PANI-CB electrodes were electrochemically cycled in half-cells to determine the operating voltage of the paired full cell. Full cells with PANI-CB were conditioned for 10 cycles before shown voltage curves. Unless otherwise noted, half-cells and full cells were cycled at 60° C. to reduce the ionic resistance of the electrolyte and facilitate electrochemical cycling (the ionic conductivity of 47LiODFB-PEG is 6.4×$10^{-7}$ and 3.3×$10^{-4}$ S/cm at 25° C. and 60° C., respectively).

CONCLUSION

Further details regarding the embodiments described herein can be found in J. Lau et al., "Dynamic tunability of phase-change material transition temperatures using ions for thermal energy storage," Volume 2, Issue 10, 20 Oct. 2021, 100613, which is herein incorporated by reference.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method comprising:
providing a device, the device comprising:
　a phase change material,
　a salt dissolved in the phase change material, the phase change material changing from a solid to a liquid at a first temperature when the salt is dissolved in the phase change material, and
　an anode and a cathode disposed in the phase change material;
applying a voltage to the anode and the cathode to substantially remove the salt from the phase change material, the phase change material changing from the solid to the liquid at a second temperature when the salt is substantially removed from the phase change material, the first temperature being a lower temperature than the second temperature.

2. The method of claim 1, further comprising:
removing the voltage from the anode and the cathode to dissolve the salt in the phase change material, the phase change material changing from the solid to the liquid at the first temperature when the salt is dissolved in the phase change material.

3. The method of claim 1, wherein the salt is dissolved in the phase change material when the device is in a first ambient temperature, wherein the salt is substantially removed from the phase change material when the device is in a second ambient temperature, and wherein the first ambient temperature is a lower temperature than the second ambient temperature.

4. The method of claim 3, wherein the first ambient temperature occurs at night time, and wherein the second ambient temperature occurs at day time.

5. The method of claim 3, wherein the first ambient temperature occurs in winter time, and wherein the second ambient temperature occurs in summer time.

6. The method of claim 1, wherein when the voltage is applied to the anode and the cathode, cations of the salt are incorporated into the anode and anions of the salt are incorporated into the cathode.

7. The method of claim 1, wherein the voltage applied to the anode and the cathode is about 2.5 volts (V) or less.

8. The method of claim 1, wherein the phase change material comprises poly(ethylene glycol) (PEG).

9. The method of claim 1, wherein the salt is a lithium salt.

10. The method of claim 1, wherein the salt is a lithium salt from a group of lithium oxalatodifluoroborate (Li-ODFB), lithium bis(trifluoromethanesulfonyl)imide (LiTFSI), lithium iodide (LiI), cesium bis(trifluoromethanesulfonyl)imide (CsTFSI), and 1-butyl-1-methylpyrrolidinium bis(trifluoromethylsulfonyl)imide-PEG ($Pyr_{14}$TFSI-PEG).

11. The method of claim 1, wherein a concentration of the salt in the phase change material when the salt is dissolved in the phase change material is about 5 mol % to 50 mol %.

12. The method of claim 1, wherein the anode comprises lithium titanium oxide ($Li_4Ti_5O_{12}$, LTO).

13. The method of claim 1, wherein the cathode comprises a material from a group of a composite of a polyaniline (PANI) conductive polymeric material and carbon black and a composite of poly(3,4-ethylenedioxythiophene) (PEDOT) and carbon nanotubes.

14. The method of claim 1, wherein the device further comprises:
a separator between the anode and the cathode.

15. The method of claim 14, wherein the separator comprises a polymer separator.

16. The method of claim 14, wherein the separator cis a separator selected from a group of a polypropylene separator and a polyvinylidene fluoride (PVDF) separator.

17. The method of claim 1, wherein the device is a thermal energy storage device.

18. A device comprising
a phase change material, a salt being dissolved in the phase change material, the phase change material operable to change from a solid to a liquid at a first temperature when the salt is dissolved in the phase change material; and
an anode and a cathode disposed in the phase change material, and when a voltage is applied to the anode and the cathode, the salt is substantially removed from the phase change material, the phase change material changing from the solid to the liquid at a second temperature when the salt is substantially removed from the phase change material, and the first temperature being a lower temperature than the second temperature.

19. The device of claim 18, further comprising:
a separator disposed between the anode and the cathode.

20. The device of claim 19, wherein the separator comprises a polymer separator.

21. The device of claim 19, wherein the separator is a separator selected from a group of a polypropylene separator and a polyvinylidene fluoride (PVDF) separator.

22. The device of claim 18, wherein the phase change material comprises poly (ethylene glycol) (PEG).

23. The device of claim 18, wherein the salt is a lithium salt.

24. The device of claim 18, wherein the salt is a lithium salt from a group of lithium oxalatodifluoroborate (Li-ODFB), lithium bis (trifluoromethanesulfonyl) imide (LiTFSI), lithium iodide (LiI), cesium bis (trifluoromethanesulfonyl) imide (CsTFSI), and 1-butyl-1-methylpyrrolidinium bis (trifluoromethylsulfonyl) imide-PEG ($Pyr_{14}$TFSI-PEG).

25. The device of claim 18, wherein a concentration of the salt in the phase change material when the salt is dissolved in the phase change material is about 5 mol % to 50 mol %.

26. The device of claim 18, wherein the anode comprises lithium titanium oxide ($Li_4Ti_{15}O_{12}$, LTO).

27. The device of claim 18, wherein the cathode comprises a material from a group of a composite of a polyaniline (PANI) conductive polymeric material and carbon black and a composite of poly (3,4-ethylenedioxythiophene) (PEDOT) and carbon nanotubes.

28. The device of claim 18, wherein when the voltage applied to the cathode and anode is removed, the salt dissolves in the phase change material, and the phase change material changes from the solid to the liquid at the first temperature when the salt is dissolved in the phase change material.

29. The device of claim 18, wherein the salt is dissolved in the phase change material when the device is in a first ambient temperature, wherein the salt is substantially removed from the phase change material when the device is in a second ambient temperature, and wherein the first ambient temperature is a lower temperature than the second ambient temperature.

30. The device of claim 29, wherein the first ambient temperature occurs at night time, and wherein the second ambient temperature occurs at day time.

31. The device of claim 29, wherein the first ambient temperature occurs in winter time, and wherein the second ambient temperature occurs in summer time.

32. The device of claim 18, wherein when the voltage is applied to the anode and the cathode, cations of the salt are incorporated into the anode and anions of the salt are incorporated into the cathode.

33. The device of claim 18, wherein the voltage applied to the anode and the cathode is about 2.5 volts (V) or less.

* * * * *